United States Patent
Porras

[11] 3,891,908
[45] June 24, 1975

[54] TORQUE SENSING DEVICE
[76] Inventor: Ruben J. Porras, 13215 S.E. 30th, Kirkland, Wash. 98004
[22] Filed: Oct. 10, 1973
[21] Appl. No.: 405,099

[52] U.S. Cl. ............... 318/434; 318/469; 318/475
[51] Int. Cl. ............................................ G05d 17/02
[58] Field of Search ............ 318/469, 434, 475, 476

[56] References Cited
UNITED STATES PATENTS

| | | | |
|---|---|---|---|
| 2,407,537 | 9/1946 | Chapman | 318/469 X |
| 2,524,361 | 10/1950 | Sawyer, Sr. et al. | 318/434 X |
| 3,530,322 | 9/1970 | Newell | 310/82 |
| 3,539,847 | 11/1970 | Gifford | 310/82 X |
| 3,811,083 | 5/1974 | Minghella | 318/469 X |

Primary Examiner—Robert K. Schaeffer
Assistant Examiner—W. E. Duncanson, Jr.
Attorney, Agent, or Firm—Seed, Berry, Vernon & Baynham

[57] ABSTRACT

A nutative type electrical motor has a nutating stator which is restricted against rotational motion by a yieldable stop. The stop is movable when the reaction torque in the stator exceeds a certain limit. Movement of the stop opens a circuit to provide some control function, such as, de-energizing the motor to stop further movement of a valve actuator.

8 Claims, 5 Drawing Figures

TORQUE SENSING DEVICE

BACKGROUND OF THE INVENTION

1. Field of the Invention

This invention pertains to nutative type motors and more specifically to control devices for such motors. In one application, the motor is used as a valve actuator.

2. Description of the Prior Art

Valve actuators powered by conventional electric motors of the non-nutating type have used torque switches to determine torque to the valve so as not to exceed the torque limitations of the valve. These torque switches are adequate for some valve actuator applications but are inadequate when precise torque limits are imposed on the operation of the valve actuator. To a large part, this inadequacy is caused by the rotor inertia in standard motors which require special braking or stopping devices not required by nutative motors due to the latter's very low rotating inertia.

SUMMARY OF THE INVENTION

It is an object of this invention to provide a torque sensing switch for a nutative type motor.

It is another object of this invention to provide a torque sensing and controlling mechanism for an electrical nutative type motor.

It is another object of this invention to provide a torque limiting control for a valve actuator powered by an electrical nutative motor.

Basically, these objects are obtained by providing a yieldable rotation restricting member on the stator which yieldable member allows the stator to rotate through a limited distance when a pre-determined reaction torque is felt by the stator. This movement of the stator or the yieldable member is detected and used to control a subsequent circuit, such as de-energizing the motor to stop further torque output. The sensing function can also be used to control other operating functions, such as to use two levels of sensed torque to produce outputs which control different functions of the motor. The sensing of reaction torque in the stator advantageously provides a low cost accurate mechanism for sensing torque output of the motor. Furthermore, sensing reaction torque at the stator allows different output gearing from the motor to be used in coupling the motor output shaft to the element being controlled such as a valve actuator, while allowing the torque sensing means to remain relatively unchanged regardless of the final desired torque limits of the valve actuator. Means are provided, however, to also change the yieldable force acting against the stator to allow the control function to occur at any desired reaction force occurring in the stator. Furthermore, bi-directional rotational reaction torque in the stator can be sensed.

DETAILED DESCRIPTION OF THE FIGURES OF THE DRAWING

Figure 1:
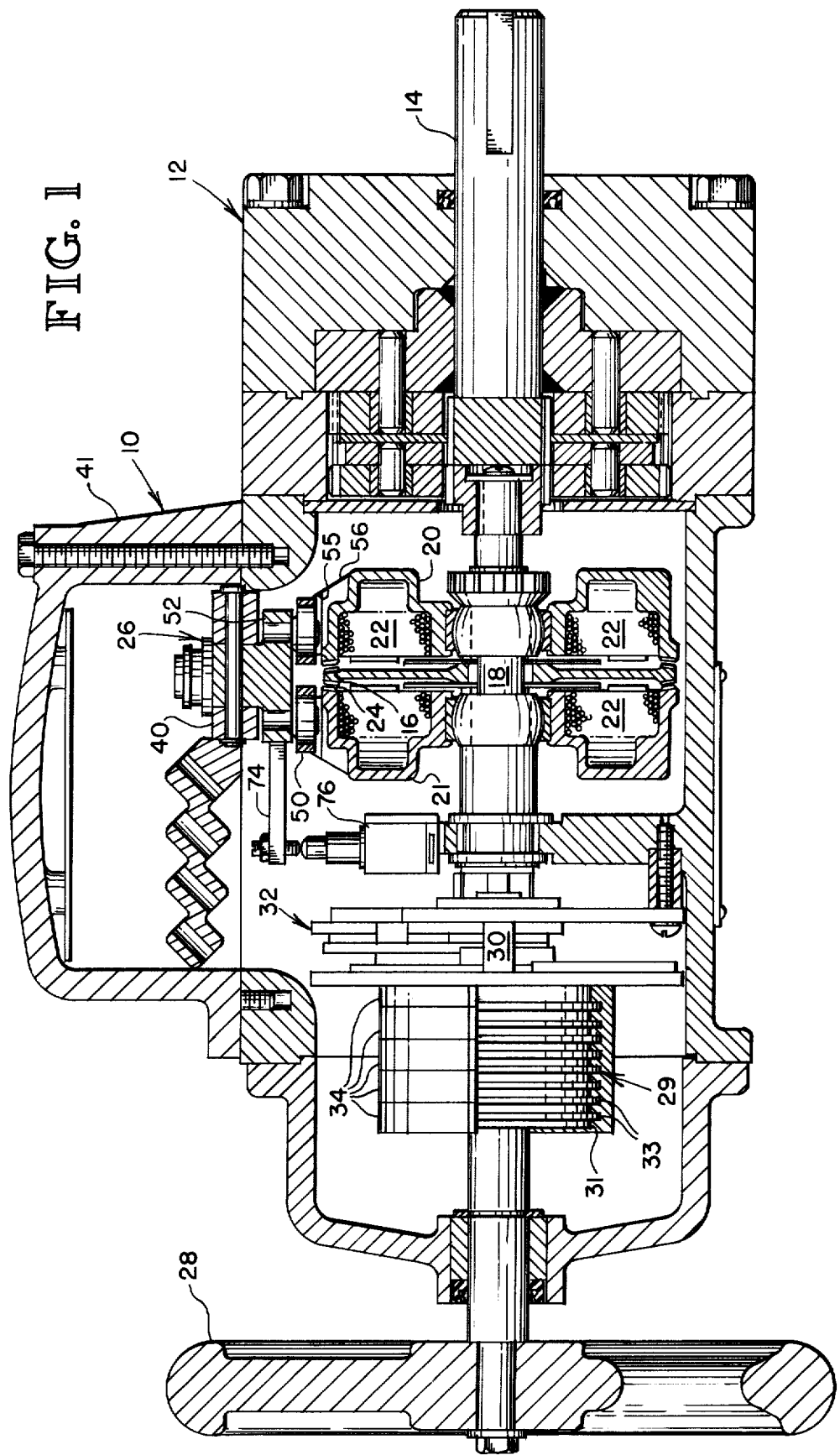
FIG. 1 is a longitudinal section of a nutative type electrical motor having a torque sensing device embodying the principles of the invention.
Figure 2:
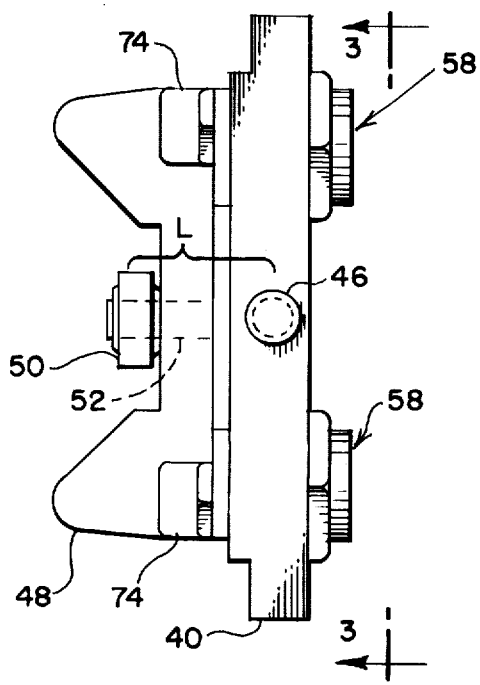
FIG. 2 is a detail of the torque sensing device shown in FIG. 1.
Figure 3:
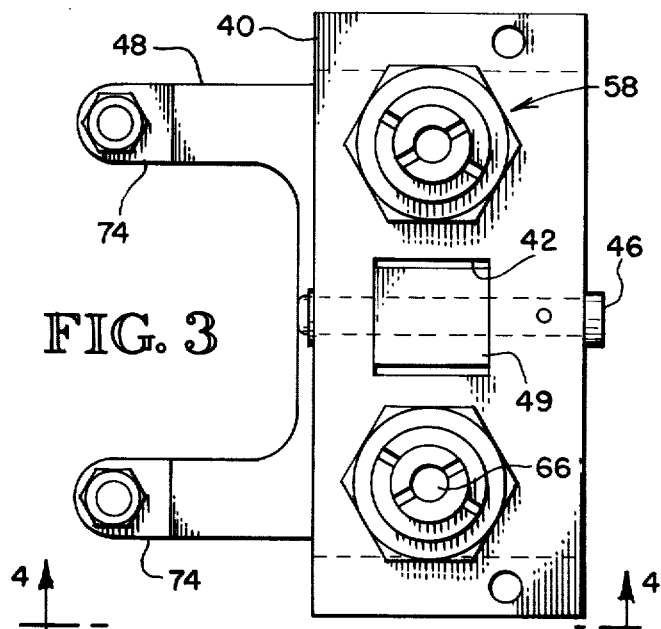
FIG. 3 is a side elevation view of the device shown in FIG. 2.

As best shown in FIG. 1, a nutative type electric motor 10, of the type illustrated in U.S. Pats. Nos. 3,341,725, 3,404,323, and 1,495,784, is shown coupled through a gear box 12 to a valve actuator shaft 14. Although the embodiment described is preferably employed for actuation of valves, such as gate valves, butterfly valves, spool valves, etc., the motor and torque sensing device also have other applications.

The motor 10 includes a rotatable rotor 16 keyed to an output shaft 18. Gimbaled to the output shaft on either side of the rotor 18 are stators 20 and 21 of the type generally discussed in the Gifford U.S. Pat. No. 3,539,847. The stators are provided each with six coils 22 creating magnetic circuits which are serially energized around the circumferences of the stators to nutatively rotate the rotor 16 and thus rotate the output shaft 18. The contacting surfaces between the rotor and the stators are geared as at 24 to provide better frictional engagement therebetween. The details of the nutative type motor are well known in the art and described by said U.S. patents, the descriptions of which are incorporated herein by reference thereto. Accordingly, further details of the motor will not be described except as where believed necessary to clarify the invention. It should be understood, of course, that as the stators nutate or precess about the shaft 18, rotational movement of the stators is limited by the yieldable torque sensing device 26 of this invention.

Manual control of the actuator shaft 14 can be obtained by a handle 28 coupled through a position sensing device 29. The position sensing device may be of any suitable design, preferably having a shaft 30 coupled to the output shaft 18. A hub 31 is rotatably mounted on the shaft 30 and is rotated thereon through a gear reduction unit 32. The gear reduction unit is provided with a gear ratio which can be changed to correspond with the gear ratio in the main gear reduction unit 12 that couples the motor to the actuating shaft 14. The hub is provided with a plurality of cams 33 which rotate past limit switches 34 such that upon a predetermined amount of rotation of the hub 31, proportional to the rotational output of the shaft 14, the switches can be selectively energized to correspond to various locations of the valve or valve actuator shaft. Preferably, in the case of a valve actuator, at least two of the switches 34 will indicate when the valve is fully opened and fully closed. Further details of the limit switch mechanism 29 will be readily apparent to one skilled in the art, and will not be further described.

The torque sensing device 26 is best shown in FIGS. 1–4 and includes a fixed torque limit plate 40 that is rigidly connected to the housing 41 of the motor 10. The limit plate is provided with a central opening 42 and two threaded side bores 44.

Pivotally mounted in the center opening 42 by a pivot pin 46, is a rocker arm plate 48 having a central boss 49 that extends through the opening 42 and is pivotally mounted on the pin 46. Thus the rocker arm plate is pivotally mounted on the limit plate 40 for limited pivotal movement about the pin 46.

A pair of roller bearings 50 are mounted on pins 52 that are held in bores on the rocker arm plate. The pins 52 are generally aligned centrally on the rocker arm plate beneath the axis of the pin 46. The bearings ride respectively in notches 55 provided in radially outwardly extending protrusion 56 integrally formed on each of the stators. Thus, as readily understood, rotational movement of the stators in either direction is limited by the bearings 50 while allowing free swashing movement of the stators in the direction toward and away from each other.

Figure 4:
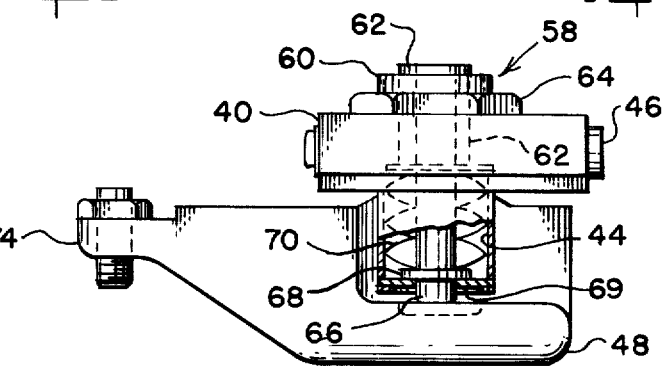
FIG. 4 is a end elevation view of the device shown in FIG. 2.

The rocker arm plate 48 is yieldably restrained against pivotal movement about the pin 46 by a pair of adjustable plungers 58. Since each of the plungers is identical only one will be described. The plunger 58 includes an outer cylindrical member 60 that is threaded in a threaded bore 44 of the limit plate. The outer cylindrical member 60 has internal threads in which is threadably mounted a spring adjustment cap 62. The cylinder can be screwed in and out of the bore 44 and then locked in place by a nut 64. Inside the cylindrical outer member 60 is an adjustment cap 62 that is threadable into and out of the cylindrical outer member along its longitudinal axis. The outer cylindrical member can be adjustably moved in and out of the bores 44 and locked in place by a lock nut 64. A pin 66 extends through the cap 62 and out through the opposite end of the outer cylindrical member 60 as best shown in FIG. 4. The pin has an integral collar 68 that abuts at its lower end on a retainer clip 69 mounted in the lower end of the outer cylindrical member. Thus, the retainer clip precludes further outward movement of the pin in the direction toward the rocker arm plate 48. A plurality of conventional belleville springs 70 rest on the collar 68 and are precompressed to the desired load, for example, 50 pounds in one embodiment, to provide a yieldable pressure against upward movement (as viewed in FIG. 4) of the pin 66. This preloading of the belleville springs is provided by the adjustable cap 62 that moves threadably downwardly in the outer cylindrical member against the springs and guides the upper member of the pin as shown in FIG. 4, for sliding movement through the cap. It can thus be seen that a very accurate yieldable preload can be placed against pivotable movement of the rocker arm in either direction about the pin 46. Since the bearings are connected to the rocker arm plate, they will hold the stators against rotation until such time as the reaction force on the stators exceeds the desired level at which time the bearings will cause a torque through the lever arm L to overcome the spring force in the plungers 58 allowing the rocker arm to pivot about the pin 46. The rocker arm 48 is provided with two switch actuating arms 74 that operate two switches 76, in the preferred embodiment for controlling the energization of the motor.

Figure 5:
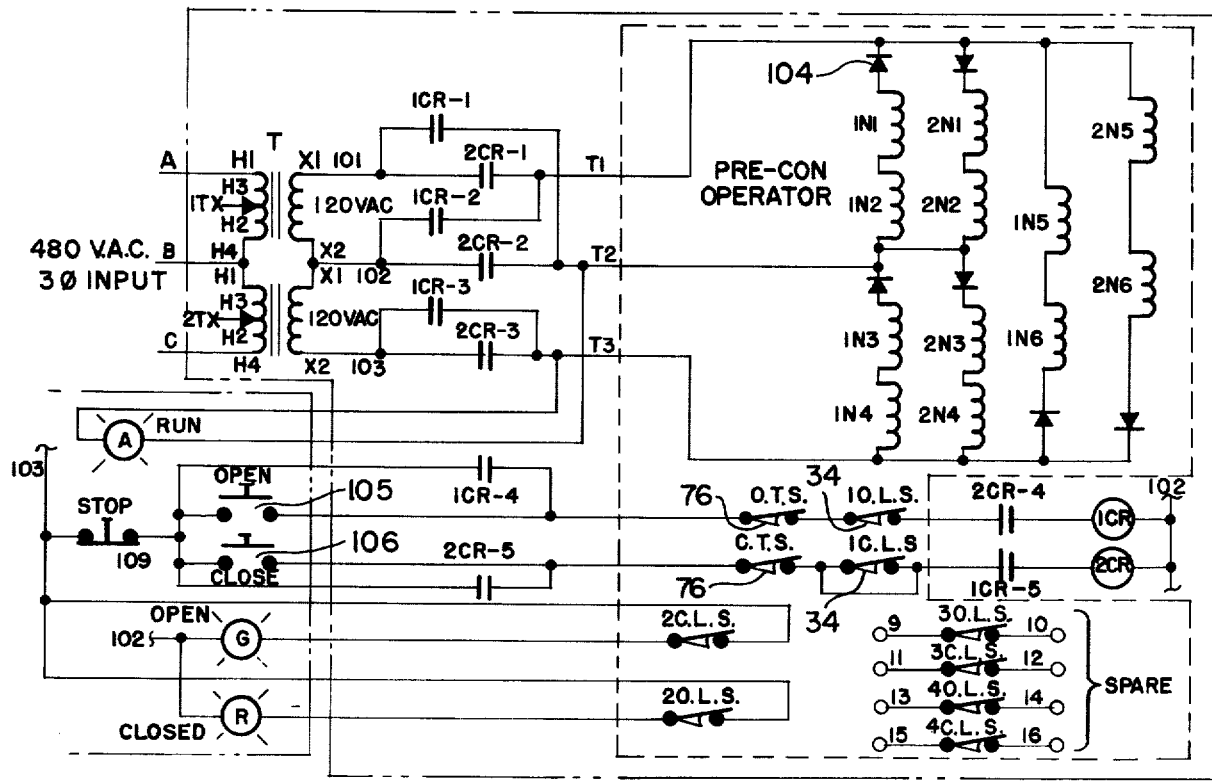
FIG. 5 is a typical electrical schematic showing one application for the torque sensing device.

A typical circuit diagram for one application of the nutative motor such as for opening and closing a valve is best illustrated in FIG. 5. Three phase 480 volt A.C. power comes in through lines A-C and is reduced to 120 volts through transformer T. The output of transformer passes through lines 101, 102 and 103 through alternate paths controlled by relay contacts 1CR-1, 2CR-1, 1CR-2, 2CR-2, 1CR-3 and 2CR-3. Outputs from these alternative paths go to lines T1, T2 and T3 which are connected to the electrical magnetic coils of the stators 20 and 21. For the purposes of the description, the coils designated 1N are on the stator 20 and the coils designated 2N are on the stator 21. Each two circumferentially serially adjacent coils are coupled together with diodes 104 providing half wave rectification such that as the phased current travels synchronously circumferentially serially around the stators, the opposed coils of the two stators are attracted to one another in a manner well known in the art. As is readily understood from the circuit in FIG. 5, the polarity of the current to each of the coils is determined by which ever of the contacts 1CR or 2CR are energized at a particular moment. Energization of these contacts is controlled by "open" and "close" switches 105 and 106 respectively. Closing switch 105 energizes relay 1CR through open torque switch OTS 76, open limit switch 1OLS 34 and relay contacts 2CR-4. If the torque has not been exceeded, open torque switch OTS 76 is closed and since the valve is open, open limit switch OLS 34 is closed. Relay contacts 1CR-1,1CR-2, 1CR-3 are closed while relay contacts 2CR-1, 2CR-2, and 2CR-3 remain open thus connecting line 101 with line T2, line 102 with line T1, and line 103 with line T3. The stators will be energized driving the rotor unitl the valve is closed thus opening open limit switch 34 to de-energize relay 1CR. Should the torque be exceeded at any time, the reaction torque in the stator will be transferred through the rods 66 until the spring precompression force is exceeded, thus opening switch OTS 76 to de-energize the relays 1CR.

To close the valve, close switch 106 is closed energizing relay 2CR through the close torque switch CTS 76 (OTS and CTS refer to the two switches 76 operated either by clockwise or respective counter clockwise limited movement of the stator), thence through close limit switch 1CLS 34 and normally closed contacts 1CR-5. Energization of relay 2CR closes relay contacts 2CR-1, 2CR-2, and 2CR-3 making the current path from line 101 to line T1; line 102 to line T2 and line 103 to line T3. AS a result, the stators nutate in the opposite direction to open the valve.

While the preferred embodiments have been illustrated and described it should be understood that variations will be apparent to one skilled in the art without departing from the principles herein. Accordingly, the invention is not to be limited to the specific embodiments described and illustrated.

The embodiments of the invention in which a particular property or privilege is claimed are defined as follows:

1. In a motor having an output shaft, a rotor secured to the output shaft, at least one stator mounted concentric with the rotary axis of said output shaft, means for restricting rotation of said stator, and means for coupling the rotor and stator for rotating the rotor and thus driving the output shaft, a torque sensing device comprising means coupled to said stator rotation restricting means for sensing a reaction torque in said stator over a predetermined amount and first and second switch means coupled to said sensing means for performing a control function, said means for restricting rotation of said stator including a stationary member, a movable member pivotally secured to said stationary member, and first and second switch actuating members on said movable member and operable upon pivoting of said movable member in opposite directions due to oppositely directed increases in reaction torque to actuate said first and second switch means, respectively.

2. The invention of claim 1 wherein said control function includes de-energizing the motor to limit the torque on the output shaft.

3. In a nutating type motor having an output shaft, a rotor secured to the output shaft, at least one stator mounted concentric with the rotary axis of said output shaft, means for restricting rotation of said stator, and means for nutatively driving the output shaft, a torque sensing device comprising means coupled to said stator rotation restricting means for sensing a reaction torque in said stator over a predetermined amount and means coupled to said sensing means for performing a control function, said stator being a swashing member, said means for restricting rotation of said stator including a force transferring member, said sensing means including spring-biased stop means engageable with said force transferring member and being movable upon the reaction torque in said stator exceeding the spring bias, switch means for opening an electrical circuit, and switch actuator means coupled to said stop means for actuating said switch means.

4. The switch of claim 3, said means for restricting rotation of said stator including bearing means and coupled to said force transferring member engaging said stator for restricting rotational movement but allowing swashing movement.

5. In a nutating type motor having an output shaft, a rotor secured to the output shaft, at least one stator mounted concentric with the rotary axis of said output shaft, means for restricting rotation of said stator, and means for nutatively driving the output shaft, a torque sensing device comprising means coupled to said stator rotation restricting means for sensing a reaction torque in said stator over a predetermined amount and means coupled to said sensing means for performing a control function, said motor including two stators engaging said rotor on opposite sides thereof, said stator rotation restricting means including a pair of bearings allowing free swashing movement of the stators, spring-biased means for holding the bearings against movement about said shaft axis until a predetermined reaction torque is exceeded by said stators and then moving with said bearings a limited amount, said means for performing a control function including switch actuator means movable with said spring-biased means, and switch means operated by said switch actuator means for operating an electrical circuit.

6. The invention of claim 4 said spring biased means being movable in either rotational direction of said stators for sensing reaction torques in either rotational direction.

7. A torque limiting device for a valve actuator having a valve closing member driven by a nutative-type electrical motor having an output shaft, a rotor coupled to said motor output shaft, and at least one stator nutatively driving said rotor, said device comprising stator rotation limiting means, means yieldably mounting said stator rotation limiting means for allowing limited rotational movement in response to the reaction torque in said stator exceeding a predetermined amount, and means responsive to said limited stator rotation for de-energizing said motor to stop movement of said valve closing member, said yieldable mounting means including a fixed limit plate, a movable rocker arm pivotally mounted on said limit plate, yieldable plunger means abutting between said limit plate and said rocker arm, said yieldable mounting means including spring means in said plunger means to allow pivotal movement of said rocker arm, switch means for de-energizing the motor, and means on said rocker arm for actuating said switch means in response to pivotal movement of said rocker arm.

8. The switch of claim 7, said stator rotation limiting means including bearing means for allowing free swashing movement of said stator.

* * * * *